United States Patent

Jean et al.

[19]

[11] Patent Number: 6,068,786

[45] Date of Patent: May 30, 2000

[54] LOW-FIRE FERRITE COMPOSITION AND A PROCESS FOR MANUFACTURING CERAMIC ARTICLES USING THE SAID COMPOSITION

[75] Inventors: Jau-Ho Jean; Cheng-Horng Lee, both of Hsinchu, Taiwan

[73] Assignee: Darfon Electronics Corp., Taiwan

[21] Appl. No.: 09/375,511

[22] Filed: Aug. 17, 1999

Related U.S. Application Data

[62] Division of application No. 09/033,655, Mar. 3, 1998, abandoned.

[30] Foreign Application Priority Data

Nov. 25, 1997 [TW] Taiwan .................................. 86117725

[51] Int. Cl.$^7$ ............................ C04B 35/30; H01R 7/113
[52] U.S. Cl. ...................................... 252/62.6; 252/62.62
[58] Field of Search ............................... 252/62.6, 62.62

[56] References Cited

U.S. PATENT DOCUMENTS

| | | | |
|---|---|---|---|
| 4,540,500 | 9/1985 | Torii et al. | 252/62.58 |
| 4,956,114 | 9/1990 | Watanabe et al. | 252/62.58 |
| 5,387,365 | 2/1995 | Moriya et al. | 252/180 |
| 5,530,416 | 6/1996 | Wakamatsu et al. | 336/192 |

FOREIGN PATENT DOCUMENTS

| | | |
|---|---|---|
| 51-48275 | 12/1976 | Japan . |
| 53-129098 | 11/1978 | Japan . |
| 1-179402 | 7/1989 | Japan . |
| 8268719 | 10/1996 | Japan . |

*Primary Examiner*—C. Melissa Koslow
*Attorney, Agent, or Firm*—Pillsbury Madison & Sutro Intellectual Property Group LLP

[57] ABSTRACT

A low-fire ceramic composition and a process for manufacturing ceramic articles using such a composition. The ferrite composition containing a mixture of finely divided particles of 0.1–2 wt % of $V_2O_5$ and 99.9–98 wt % of Ni—Cu—Zn ferrite can be densified at an ultra-low temperature of 850–900° C. to form a ceramic ferrite body having a sufficient sintered density. The ferrite composition can be processed with organic solvents, polymeric binder and plasticizer to produce an unfired green tape which is cofirable with high electrical conductivity metallurgies such as silver to produce multilayer ceramic inductor devices.

1 Claim, No Drawings

LOW-FIRE FERRITE COMPOSITION AND A PROCESS FOR MANUFACTURING CERAMIC ARTICLES USING THE SAID COMPOSITION

This is a division of application Ser. No. 09/033,655, filed Mar. 3, 1998, now abandoned.

BACKGROUND OF THE INVENTION

1. Field of the Invention

The present invention relates to a ferrite composition. More particularly, it relates to a low-fire ferrite composition and a process for manufacturing ceramic articles using such a composition.

2. Description of the Related Arts

Ni—Cu—Zn ferrites have been used for the manufacture of multilayer ceramic inductor devices. So as to improve the quality factor of the devices, Ni—Cu—Zn ferrites are usually co-fired with high electrical conductivity metallurgies such as silver, copper, or gold during the manufacturing process. In the case of copper, the manufacturing process is rather troublesome because the co-firing must be conducted in a reducing atmosphere to prevent the copper from oxidizing. Moreover, the polymeric binder added in the casting step becomes difficult to remove in the non-oxygen atmosphere and some organic residues will be left in the sintered bodies. On the other hand, for reasons of economy, it is preferable to employ silver rather than gold in the co-firing, which can be conducted in air and for which no external atmosphere control is required.

While carrying out the co-firing of Ni—Cu—Zn ferrite and silver, it is important to control the sintering temperature, which should not exceed 900° C., and the densification should be completed as soon as possible to avoid silver diffusing into the ferrite bodies. Conventional ferrite compositions, however, have unsatisfactory density when fired at such low temperatures, and must be sintered at a temperature of about 1,100° C. before a sufficient density can be achieved. Accordingly, it is desirable to develop a low-fire ferrite composition which can be sintered at a temperature below 900° C. to a sufficient density in a short time.

U.S. Pat. No. 5,387,365 discloses a ferrite magnet of the formula $MO \cdot nFe_2O_3$, where M is Sr or Ba and n=5.0 to 6.2, calcined at 1275–1300° C. for 15–60 minutes.

U.S. Pat. No. 5,530,416 discloses a ferrite core coated with borosilicate zinc glass. The ferrite core is produced by: adding a low-temperature-sintered oxidized metal, such as $BiO_2$ and PbO, and a resin binder to a ferrite powder of Mn, Fe, Co, Ni or the like; mixing the material together; and sintering the molded article at a low temperature.

U.S. Pat. No. 4,956,114 discloses a sintered ferrite body which is fired at a relatively low temperature of up to 950° C., the body comprising 10–83 wt % of Ni—Cu—Zn ferrite, 15–75 wt % of borosilicate glass, and optionally 2–15 wt % of boron oxide.

Japanese Patent No. 51-151,331 and U.S. Pat. No. 4,540,500 disclose a sintered ferrite composition which is fired at a temperature below 1000° C., comprising 5 wt % of lithium borosilicate glass.

SUMMARY OF THE INVENTION

It is therefore an object of the invention to provide a ferrite composition which can be densified at an ultra-low temperature of 850–900° C. to a sufficient density within 15–120 minutes.

Another object of the invention is to provide a process for manufacturing a ceramic article by using the above-described ferrite composition. The ceramic article produced thereby is characterized by high sintered density and superior initial magnetic permeability.

According to an aspect of the invention, there is provided a low-fire ferrite composition containing 99–98% by weight of Ni—Cu—Zn ferrite and 1.0–2.0% by weight of $V_2O_5$ as a sintering aid thereof.

According to another aspect of the invention, there is provided a process for the manufacture of a ceramic article, the process comprising the steps of: (a) mixing ceramic powders of 1.0–2.0% by weight of $V_2O_5$ and 99–98% by weight of Ni—Cu—Zn ferrite to form a powder mixture; (b) fabricating the powder mixture into a green compact; and (c) densifying the green compact at a temperature of 850–900° C. in air. In the preferred embodiment of the invention, a high sintered density of 97% can be obtained even if the ferrite composition is sintered at a low temperature of 875° C. for only 15 minutes. The low-fire feature of such a composition enables it to be co-fired with low melting point metals or their alloys to manufacture ceramic inductor articles.

DETAILED DESCRIPTION OF THE INVENTION

The present invention provides a ferrite composition comprising Ni—Cu—Zn ferrite and $V_2O_5$. A Ni—Cu—Zn ferrite composition containing $V_2O_5$ as a sintering aid can be densified at relatively low temperatures ranging from 850–900° C. Even at such low temperatures, the composition can be densified to a relative sintered density greater than 95%.

As can be seen from the phase diagrams, the eutectic points of $V_2O_5$—$Fe_2O_3$, $V_2O_5$—NiO, $V_2O_5$—CuO, and $V_2O_5$—ZnO, are 635° C., 630° C., 620° C., and 627° C. respectively, and $V_2O_5$ itself has a melting point of 675° C.. Accordingly, it is reasonable to employ $V_2O_5$ as a sintering aid to lower the sintering temperature and to shorten the sintering time. While $V_2O_5$ is regarded as the low-temperature sintering phase, by contrast the Ni—Cu—Zn ferrite is regarded as being in the high-temperature ceramic phase. The Ni—Cu—Zn ferrite used in the invention may contain, for example, 64% by weight of $Fe_2O_3$, 31% by weight of NiO, 1.3% by weight of ZnO, and 3.7% by weight of CuO.

The ferrite composition of the present invention can be applied to the manufacture of ceramic inductor devices. For example, the composition can be fabricated into a multilayer ceramic inductor by way of the following procedures: (a) preparing a slurry consisting essentially of (i) 70–85% by weight of a ferrite composition comprising 0.1–2.0 k by weight of $V_2O_5$ and 99.9–98% by weight of Ni—Cu—Zn ferrite, and (ii) 15–30% by weight of organic carriers including organic binder; (b) casting the slurry to form a green tape; (c) printing conductive pastes onto the green tape; (d) laminating together a plurality of printed green tapes to form a multilayer ceramic green compact; (e) subjecting the multilayer ceramic green compact to binder burnout; and (f) co-firing the substantially binder-free multilayer ceramic green compact and a high electrical conductivity metallurgy in air.

The invention is described in greater detail with reference to the following non-limiting examples.

COMPARATIVE EXAMPLE

First, a Ni—Cu—Zn ferrite was prepared as follows. Starting materials were weighed so as to obtain a powder mixture consisting of 145.5 g of NiO, 17.7 g of CuO, 6.25 g of ZnO, and 300.2 g of $Fe_2O_3$. The powder mixture of the starting materials was milled for two hours in a ball mill containing 2,000 g by weight of stainless balls and 600 c.c. of water. Thereafter, the slurry of the powder mixture was sieved with a sieve of 100 mesh and dried over an oven at 80° C.. The dried lumps were crushed and ground with pestle and mortar, and then calcined at 740° C. for 3 hours with a heating rate of 4° C./min.

Subsequently, the calcined material was ground with pestle and mortar, again milled in the ball mill for 22 hours, and subjected to the same procedures of sieving, drying, and grinding as described in the last paragraph, followed by sieving with a sieve of 100 mesh, thereby obtaining the Ni—Cu—Zn ferrite powder.

Green compacts of sample Nos. 1–4 were prepared by way of the following procedures. 20 g of Ni—Cu—Zn ferrite powder was added to the mixture of 1-propyl alcohol (25 ml) and 5% by weight of polyethylene glycol 200,which was uniformly mixed for 2 hours in a three-roller mill with stainless balls. The resulting mixture was then dried over an oven at 80° C. and ground into powders which can be fabricated into desired shapes for sintering. In accordance with this invention, 1.3 g of the powder mixture was placed in a round-shaped die having a diameter of 13 mm and pressed at a uni-axial pressure of 90 MPa for 15 minutes to obtain the green compact. The green compacts were subjected to binder burnout before sintering. The green compacts were slowly heated with a heating rate of 5° C./min and maintained at 500° C. for one hour to ensure complete binder burnout. The substantially binder free compacts 1–4 were then sintered at temperatures ranging from 875° C. to 900° C. in air. The compacts were moved into a furnace, heated to 875–900° C. within 5 minutes and maintained at the sintering temperature for 15–120 minutes. The sintered bodies were then cooled in ambient air and measured for relative sintered density by the water displacement method. The sintering conditions of sample Nos. 1–4 and the relative sintered density of the sintered bodies are listed in Table 1. As seen from Table 1, all the relative sintered densities of pure Ni—Cu—Zn ferrite are below 95%.

EXAMPLE 1

Green compacts of sample Nos. 5–6, each containing 99.5% by weight of Ni—Cu—Zn ferrite and 0.5% by weight of $V_2O_5$, were prepared by the same procedures as followed in the Comparative Example. The green compacts were then subjected to binder burnout and sintered at 875° C. (No.5) and 900° C. (No.6) respectively for 15 minutes. The relative sintered density of the sintered bodies thus obtained were then measured and are listed in Table 1.

EXAMPLE 2

Green compacts of sample Nos. 7–10, each containing 99% by weight of Ni—Cu—Zn ferrite and 1% by weight of $V_2O_5$, were prepared by the same procedures as followed in the Comparative Example. After being subjected to binder burnout, compacts of sample Nos. 7, 8, and 9 were sintered at 875° C. for 15, 60 and 120 minutes respectively, while the compact of sample No. 10 was sintered at 900° C. for 15 minutes. The relative sintered density of the sintered bodies thus obtained were measured and are listed in Table 1. As seen from Table 1, even at such low temperatures, the ferrite composition containing 1% by weight of $V_2O_5$ can be sintered to a high relative sintered density of 97–98%.

EXAMPLE 3

Green compacts of sample Nos. 11–12, each containing 98% by weight of Ni—Cu—Zn ferrite and 2% by weight of $V_2O_5$, were prepared by the same procedures as followed in the Comparative Example. After being subjected to binder burnout, the green compacts were then sintered at 875° C. (No.11) and 900° C. (No.12) respectively for 15 minutes. The relative sintered density of the sintered bodies thus obtained were measured and are listed in Table 1. As seen Table 1, a relative sintered density greater than 90% till be achieved.

TABLE 1

| Sample No. | $V_2O_5$ (wt %) | Sintering temperature (°C) | Sintering time (min) | Relative sintered density (%) | Initial magnetic permeability (@ 1 MHz) | Quality factor (@ 1 MHz) | Inductance (@ 1 MHz) |
|---|---|---|---|---|---|---|---|
| 1 | 0 | 875 | 15 | 86 | — | — | — |
| 2 | 0 | 875 | 60 | 94 | — | — | — |
| 3 | 0 | 875 | 120 | 94 | — | — | — |
| 4 | 0 | 900 | 15 | 93 | — | — | — |
| 5 | 0.5 | 875 | 15 | 72 | — | — | — |
| 6 | 0.5 | 900 | 15 | 78 | 10 | 50 | 0.67 |
| 7 | 1.0 | 875 | 15 | 97 | 17 | 26 | 1.14 |
| 8 | 1.0 | 875 | 60 | 98 | 19 | 25 | 1.26 |
| 9 | 1.0 | 875 | 120 | 98 | 20 | 24 | 1.32 |
| 10 | 1.0 | 900 | 15 | 98 | 20 | 44 | 1.28 |
| 11 | 2.0 | 875 | 15 | 92 | — | — | — |
| 12 | 2.0 | 900 | 15 | 97 | — | — | — |

In Table 1, dashes indicate that the test was not performed. As already mentioned, conventional ferrite compositions which are free of $V_2O_5$ must be sintered at a temperature of about 1,100° C. before a sufficient density can be achieved. In contrast, the ferrite compositions of Example 2, containing 1% by weight of $V_2O_5$, were fired at an ultra-low temperature of 875–900° C. to reach a density greater than 95% within 15–120 minutes. The relatively low sintering temperature and the shorter sintering time make the ferrite composition suitable for firing with low melting point metals or their alloys to produce ceramic inductor devices. It can also be seen from Table 1 that the ferrite bodies thus obtained exhibited high initial magnetic permeability (15–20 at 1 MHz) and reasonable quality factor (20–50 at 1 MHz).

EXAMPLE 4

The ferrite compositions of the above examples can be co-fired with high electrical conductivity metallurgies such as silver to produce multilayer ceramic inductor devices by the following procedures.

First, a slurry was prepared by incorporating 70–85% by weight of the above-described ferrite composition and 30–15% by weight of organic carriers including organic solvents such as toluene or ethanol, organic binders such as polyvinyl butyal (PVB), and organic plasticizers such as dibutyl phthalate (DBP). The slurry was cast to obtain a green tape having a thickness of about 125 $\mu$m, which was further shaped into a square tape of 100×100 mm by blanking. The shaped tape was then punched to form a plurality of via holes having a diameter of about 125 $\mu$m at desired positions on the tape. By a printing technique, conductive pastes such as Ag or Au paste were applied on the via holes, and conductive wires were subsequently printed onto the tape by the same technique. Thereafter, a plurality of printed green tapes were assembled in registry and laminated at 60–100° C. under a pressure of 1000–3000 psi to form a multilayer ceramic green compact. Finally, the multilayer green compact was subjected to binder burnout and co-fired with a high electrical conductivity metallurgy in air to complete densification.

Other Embodiments

The ferrite composition of the present invention can also be fabricated into ceramic articles of various shapes for different purposes by conventional techniques such as die pressing, cold isostatic pressing, and hot isostatic pressing. Taking die pressing as an example, the powder mixture of the ferrite composition is mixed with water and organic binders such as polyvinyl alcohol (PVA) to form a wet mixture, which is then granulated by spray drying. Then the spray dried admixture is successively subjected to die pressing, binder burnout and sintering, thereby forming the ceramic inductor article.

What is claimed is:

1. A process for manufacturing a ceramic article, comprising the steps of:

(a) mixing ceramic powders 1.0–2.0% by weight of $V_2O_5$ and 99–98% by weight of Ni—Cu—Zn ferrite to form a powder mixture;

(b) fabricating the powder mixture into a green compact; and (c) densifying the green compact at a temperature of 850–900° C. in air for about 15–120 minutes.

* * * * *